United States Patent
Seki et al.

(10) Patent No.: US 12,529,542 B2
(45) Date of Patent: Jan. 20, 2026

(54) OPTICAL SIGHTING DEVICE

(71) Applicant: LIGHT OPTICAL WORKS, LTD., Nagano (JP)

(72) Inventors: Kenichi Seki, Nagano (JP); Kan Hanaoka, Nagano (JP); Tsutomu Akiba, Nagano (JP)

(73) Assignee: LIGHT OPTICAL WORKS, LTD., Nagano (JP)

( * ) Notice: Subject to any disclaimer, the term of this patent is extended or adjusted under 35 U.S.C. 154(b) by 48 days.

(21) Appl. No.: 18/774,956

(22) Filed: Jul. 17, 2024

(65) Prior Publication Data
US 2025/0264301 A1    Aug. 21, 2025

(30) Foreign Application Priority Data
Feb. 16, 2024    (JP) .................................. 2024-022192

(51) Int. Cl.
*F41G 1/38*    (2006.01)
*G02B 23/16*    (2006.01)

(52) U.S. Cl.
CPC ............... *F41G 1/38* (2013.01); *G02B 23/16* (2013.01)

(58) Field of Classification Search
CPC .................................. F41G 1/38; G02B 23/16
USPC ............................ 42/120, 122; 359/428, 429
See application file for complete search history.

(56) References Cited

U.S. PATENT DOCUMENTS

| | | | | |
|---|---|---|---|---|
| 3,008,237 A | * | 11/1961 | Harris | G02B 27/32 359/428 |
| 3,121,163 A | * | 2/1964 | Rickert | G02B 27/34 356/247 |
| 3,506,330 A | * | 4/1970 | Allen | G02B 23/14 359/422 |
| 4,247,161 A | * | 1/1981 | Unertl, Jr. | F41G 1/38 42/122 |
| 4,255,013 A | * | 3/1981 | Allen | G02B 23/145 359/422 |

(Continued)

FOREIGN PATENT DOCUMENTS

| | | |
|---|---|---|
| EP | 0153740 | 9/1985 |
| JP | 2022109448 | 7/2022 |
| WO | 2016160460 | 10/2016 |

OTHER PUBLICATIONS

"Search Report of Europe Counterpart Application", issued on Dec. 10, 2024, pp. 1-6.

*Primary Examiner* — Joshua E Freeman
(74) *Attorney, Agent, or Firm* — JCIPRNET (57) ABSTRACT

An optical sighting device 10 used by being installed to a firearm includes: an objective system part 12, forming an inverted image of a target object on a first focal plane; and an erect system part 14, forming an erect image obtained by reversing the inverted image on a second focal plane. The erect system 14 has: lenses 112 to 116 arranged between the first focal plane and the second focal plane; and a movable cylinder 134 as an erect system cylinder holding the lenses 112 to 116. The adjustment mechanism 20 is a mechanism for adjusting tilting of an axial direction of the movable cylinder, and has: an advancing-retracting shaft 204 as an advancing-retracting member advancing and retracting on an end side of the movable cylinder 134; and a spring 206 as a double torsion spring biasing the movable cylinder 134 toward the advancing-retracting shaft 204.

8 Claims, 6 Drawing Sheets

(56) References Cited

U.S. PATENT DOCUMENTS

| | | | | |
|---|---|---|---|---|
| 4,789,231 | A * | 12/1988 | Shimizu | G02B 27/32 |
| | | | | 359/422 |
| 6,005,711 | A * | 12/1999 | Mai | G02B 7/10 |
| | | | | 359/425 |
| 6,449,108 | B1 * | 9/2002 | Bell | G02B 23/14 |
| | | | | 359/425 |
| 9,429,390 | B2 * | 8/2016 | Stockdill | G02B 23/16 |
| 9,835,819 | B2 * | 12/2017 | Tang | G02B 7/04 |
| 11,243,049 | B1 * | 2/2022 | Enzinger | G02B 27/36 |
| 11,372,228 | B1 * | 6/2022 | Davis | G02B 23/00 |
| 2002/0089742 | A1 * | 7/2002 | Otteman | G02B 7/027 |
| | | | | 359/425 |
| 2009/0223107 | A1 * | 9/2009 | Lin | G02B 23/04 |
| | | | | 42/115 |
| 2014/0007486 | A1 * | 1/2014 | Hornung | F41G 1/38 |
| | | | | 219/121.72 |
| 2015/0247702 | A1 * | 9/2015 | Davidson | F41G 1/473 |
| | | | | 42/122 |
| 2016/0084616 | A1 * | 3/2016 | Jahromi | G02B 7/10 |
| | | | | 42/122 |
| 2018/0180382 | A1 * | 6/2018 | Tang | F41G 11/007 |
| 2018/0180383 | A1 * | 6/2018 | Lin | G02B 7/023 |
| 2023/0134361 | A1 * | 5/2023 | Enzinger | F41G 1/38 |
| | | | | 42/122 |

* cited by examiner

OPTICAL SIGHTING DEVICE

CROSS-REFERENCE TO RELATED APPLICATION

This application claims the priority benefit of Japan application serial no. 2024-022192, filed on Feb. 16, 2024. The entirety of the above-mentioned patent application is hereby incorporated by reference herein and made a part of this specification.

BACKGROUND

Technical Field

The invention relates to an optical collimator.

Description of Related Art

Conventionally, optical sighting devices equipped on hunting firearms and sports firearms have been widely used (see, for example, Patent Document 1). In addition, as an optical sighting device, for example, a configuration including an adjustment mechanism for adjusting an impact position is widely used.

[Patent Document 1] Japanese Laid-open No. 2022-109448

In the optical sighting device, for example, by forming an inverted image on a first focal plane by using an objective system (objective optical system) and forming an image, on a second focal plane, by reversing the inverted image into an erect image by an erect system (erect optical system), an image of the target object is visually recognized by the user. In addition, in such configuration, for example, there may be instances where the adjustment is made in relation to the erect orthogonal system to tilt a cylindrical body holding at least a portion of the lens. Then, in such case, generally, the wider the range within which the cylindrical body is able to tilt, the broader the adjustable range (adjustment width of the optical sighting device) becomes. Therefore, conventionally, a configuration able to further widen the range within which the cylindrical body is able to tilt is desired. Therefore, an objective of the invention is to provide an optical sighting device capable of addressing such issue.

In the optical sighting device using the cylindrical body, in the case of adjusting the tilting of the cylindrical body, for example, it can be as considered to tilt the cylindrical body by using an advancing-retracting member that advances and retracts on an end side of the cylindrical body. In such case, at the time when the advancing-retracting member retracts, for example, it can be considered as using a spring that biases the cylindrical body toward the advancing-retracting member, thereby moving an end of the cylindrical body by matching the movement of the advancing-retracting member. Through extensive research, the inventors of the application have discovered that in such a configuration the adjustment range of the optical sighting device can be appropriately expanded by using a double torsion spring. Through even further extensive research, the inventors of the application further discovered the features necessary to obtain such effects, leading to the invention.

SUMMARY

The invention provides an optical lighting device. The optical sighting device is installed to a firearm to be used and includes: an objective system part, forming an inverted image of a target object serving as a target of sighting on a first focal plane; an erect system part, forming an erect image obtained by reversing the inverted image on a second focal plane; and an adjustment mechanism, performing adjustment with respect to the erect system part. The erect system part has: a lens, arranged between the first focal plane and the second focal plane; and an erect system cylinder, as a cylindrical body holding the lens. The adjustment mechanism is a mechanism that performs adjustment to tilting an axial direction of the erect system cylinder, and has: an advancing-retracting member that advances and retracts on an end side of the erect system cylinder; and a double torsion spring, biasing the erect system cylinder toward the advancing-retracting member.

BRIEF DESCRIPTION OF THE DRAWINGS

FIGS. 1A and 1B are views illustrating an optical sighting device 10 according to an embodiment of the invention.

FIGS. 2A and 2B are views illustrating an adjustment mechanism 20 in greater detail.

FIGS. 3A and 3B are views illustrating an example of how the spring 206 is installed.

FIGS. 4A and 4B are views illustrating an example of how the spring 206 is installed.

FIGS. 5A and 5B are views illustrating a modified example of the configuration and a way of fixing the spring 206.

DESCRIPTION OF THE EMBODIMENTS

The invention provides an optical lighting device. The optical sighting device is installed to a firearm to be used and includes: an objective system part, forming an inverted image of a target object serving as a target of sighting on a first focal plane; an erect system part, forming an erect image obtained by reversing the inverted image on a second focal plane; and an adjustment mechanism, performing adjustment with respect to the erect system part. The erect system part has: a lens, arranged between the first focal plane and the second focal plane; and an erect system cylinder, as a cylindrical body holding the lens. The adjustment mechanism is a mechanism that performs adjustment to tilting an axial direction of the erect system cylinder, and has: an advancing-retracting member that advances and retracts on an end side of the erect system cylinder; and a double torsion spring, biasing the erect system cylinder toward the advancing-retracting member.

In such configuration, for example, through an operation of moving the advancing-retracting member toward the erect system cylinder, the axial direction of the erect system cylinder can be tilted by pressing an end side of the erect system cylinder by using the advancing-retracting member. In such case, even at the time when the advancing-retracting member retracts, by biasing the erect system cylinder toward the advancing-retracting member by using the double torsion spring, the axial direction of the erect system cylinder can be changed by matching the movement of the advancing-retracting member, for example. Therefore, according to such configuration, for example, the tilting of the axial direction of the erect system cylinder can be adjusted appropriately. Also, in the configuration, regarding the adjustment with respect to the erect system part in relation to the adjustment mechanism, for example, it can be considered as making the adjustment to the optical sighting device by tilting the axial direction of the erect system cylinder, for example. In such case, by using the double torsion spring as a spring biasing the erect system cylinder, for example, a spring with high resilience can be used, as compared with the case where the plate spring, etc., is used. Accordingly, for example, the range in which the erect system cylinder is tilted can be increased, and, regarding the adjustment to the optical sighting device, it is possible to have a large adjustment width. Therefore, according to the configuration, the optical sighting device can be adjusted appropriately, for example.

In such configuration, for example, the adjustment mechanism further has a spring fixing part, fixing an end and an other end of the double torsion spring. In such case, for example, the spring fixing part fixes an end and an other end of the double torsion spring to the erect system cylinder and a different cylindrical body. According to the configuration, for example, the double torsion spring can be fixed appropriately to a position where biasing can be performed with respect to the erect system cylinder. As the cylindrical body different from the erect system cylinder, for example, a cylindrical body disposed at a position adjacent to the erect system cylinder, for example, can be used appropriately. More specifically, as the different cylindrical body, for example, a lens holder, etc., holding at least a portion of a lens in the objective system part, for example, can be appropriately used. According to such configuration, for example, the number of components forming the optical sighting device can be prevented from excessively increasing, and the double torsion spring can be appropriately fixed. In addition, regarding the different cylindrical body, it can be considered as a spring fixing cylindrical body, etc., used for fixing the double torsion spring, for example. As the spring fixing cylindrical body, for example, a cylindrical body other than the lens holder may be used.

In the case of using the spring fixing part, the spring fixing part has, for example, a spring end fixing plate for each of the end and the other end of the double torsion spring. In such case, the spring end fixing plate is, for example, a plate-shaped body fixed to an outer surface of the spring fixing cylindrical body. The spring end fixing plate is, for example, fixed to an outer surface of the spring fixing cylindrical body by sandwiching the end of the double torsion spring with an outer surface of a spring fixing cylindrical body that is the different cylindrical body, for example. In such case, the spring end fixing plate, for example, a plate-shaped part and a protrusion part. The plate-shaped part is a plate-shaped portion fixed along the outer surface of the spring fixing cylindrical body. The protrusion part is a portion protruding from the plate-shaped part. In a state in which the protrusion part is inserted into a coil part, which is a portion on which a wiring material is wound, in the double torsion spring, and the spring end fixing plate is fixed to the outer surface of the spring fixing cylindrical body. According to the configuration, for example, the double torsion spring can be fixed appropriately with respect to the spring fixing cylindrical body.

In such configuration, for example, the spring fixing part, for example, further has a screw fixing the plate-shaped part of the spring end fixing plate onto the outer surface of the spring fixing cylindrical body. The plate-shaped part, for example, has: a cylindrical body side surface, which is a surface facing a side of the spring fixing cylindrical body at a time of being fixed to the spring fixing cylindrical body; and an outer side surface, which is a surface on a back side of the cylindrical body side surface. Moreover, in the plate-shaped part, for example, a screw hole penetrating through from the outer side surface toward the cylindrical body side surface is formed as a hole through which the screw passes. The screw is inserted into the screw hole from a side of the outer side surface in the plate-shaped part. According to the configuration, for example, the spring end fixing plate can be fixed appropriately with respect to the spring fixing cylindrical body. Accordingly, the double torsion spring can be fixed appropriately with respect to the spring fixing cylindrical body, for example. In addition, in this case, the orientation of the force received by the screw at the biasing time when the erect system cylinder is biased by the double torsion spring can be considered as a direction different from the insertion direction of the screw. More specifically, the orientation of the force received by the screw at the time of biasing, for example can be considered as a direction orthogonal to the insertion direction of the screw. Therefore, in such case, even if force is applied to the screw at the time of biasing, the screw is unlikely to fall off. Therefore, for example, the spring end fixing plate can be appropriately prevented from falling off, etc., due to the influence of the force at the time of biasing.

In addition, in such configuration, a concave part accommodating the plate-shaped part is formed on the outer surface of the spring fixing cylindrical body. In such case, at a biasing time of biasing the erect system cylinder by using the double torsion spring, the end of the double torsion spring is pressed against a wall surface of the concave part, for example. According to the configuration, for example, the position of the end of the double torsion spring can be fixed appropriately at the time of biasing. Accordingly, for example, by using the double torsion spring, the erect system cylinder can be appropriately biased. Regarding the position where the spring end is fixed, the spring end fixing plate used for fixing the end of the double torsion spring and the spring end fixing plate used for fixing the other end of the double torsion spring are, for example, fixed at positions facing each other by sandwiching a center of a circle of a cross-section orthogonal to an axial direction of the spring fixing cylindrical body on the outer surface of the spring fixing cylindrical body. According to the configuration, for example, the function of the double torsion spring can be more appropriately exerted. In addition, in such case, by using the double torsion spring, for example, the distance between the fulcrum of the spring and the acting point can be appropriately increased without blocking the optical path in the optical sighting device 10. In this way, for example, the range in which the erect system cylinder is able to tilt can be more appropriately increased.

In addition, in the configuration, as the adjustment mechanism, for example, a mechanism for adjusting the impact position by tilting the axial direction of the erect system cylinder can be used appropriately. In such case, the adjustment mechanism, for example, further has: an upper-lower adjustment operation part, receiving, from a user, an operation that performs adjustment to the impact position in an upper-lower direction; and a left-right adjustment operation part, receiving, from the user, an operation that performs adjustment to the impact position in a left-right direction. In such case, the adjustment mechanism has, as an advancing-retracting member, for example: an upper-lower advancing-retracting shaft, which is the advancing-retracting member that is shaft-like and advances and retracts in the upper-lower direction in accordance with the operation of the user with respect to the upper-lower adjustment operation part, and a left-right advancing-retracting shaft, which is the advancing-retracting member that is shaft-like and advances and retracts in the left-right direction in accordance with the operation of the user with respect to the left-right adjustment operation part. In addition, the double torsion spring, for example, biases the erect system cylinder with respect to both the upper-lower advancing-retracting shaft and the left-right advancing-retracting shaft. In such case, regarding that the double torsion spring biases the erect system cylinder with respect to the upper-lower advancing-retracting shaft, for example, it can be considered as that the double torsion spring biases the erect system cylinder, so that the tilting of the erect system cylinder changes by matching the movement of the upper-lower advancing-retracting shaft when the upper-lower advancing-retracting shaft retracts, for example. Regarding that the double torsion spring biases the erect system cylinder with respect to the left-right advancing-retracting shaft, for example, it can be considered as that the double torsion spring biases the erect system cylinder toward the left-right advancing-retracting shaft, so that the tilting of the erect system cylinder changes by matching the movement of the left-right advancing-retracting shaft when the left-right advancing-retracting shaft retracts, for example. According to such configuration, for example, at the time of adjusting the impact position in both of the upper-lower direction and the left-right direction, the erect system cylinder 134 can be biased appropriately by using one double torsion spring. In this case, by using the double torsion spring, the spring is brought into contact with a wide range of the erect system cylinder, for example, thereby biasing the erect system cylinder. Accordingly, for example, biasing in multiple directions can be performed appropriately with respect to the erect system cylinder. In addition, as a configuration of the invention, it can be considered to adopt a method for adjusting an optical sighting device with the same features. In such case, for example, the same effects can also be obtained.

According to the invention, for example, the optical sighting device can be adjusted appropriately.

Figure 1A:
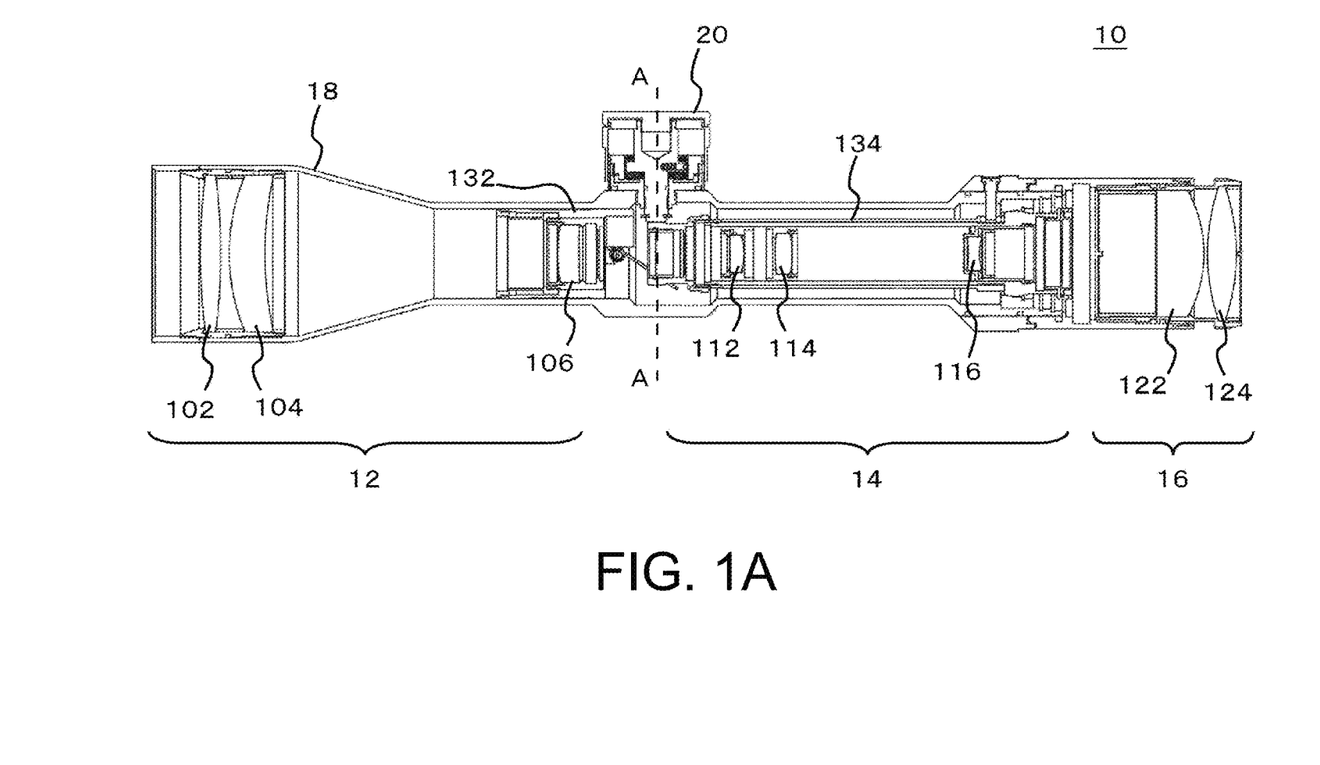
FIG. 1A is a cross-sectional view illustrating an example of a configuration of main components of an optical sighting device 10.
Figure 1B:
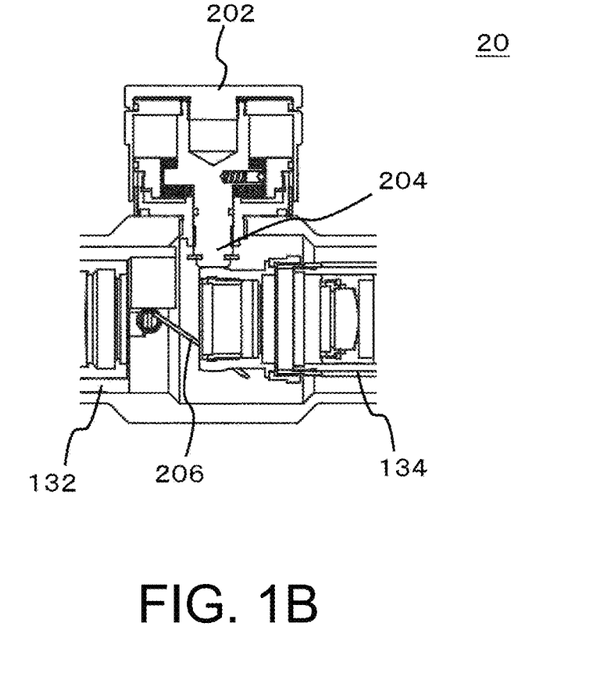
FIG. 1B is an enlarged view in a vicinity of a position indicated by using a dot-chain line in FIG. 1A.

In the following, the embodiments of the invention are described with reference to the drawings. FIGS. 1A and 1B are views illustrating an optical sighting device 10 according to an embodiment of the invention. FIG. 1A is a cross-sectional view illustrating an example of a configuration of main components of an optical sighting device 10. FIG. 1B is an enlarged view in a vicinity of a position indicated by using a dot-chain line in FIG. 1A. The optical sighting device 10 is an optical machine allowing the user to visually recognize a target object, and is installed to a firearm, such as a hunting firearm or a sports firearm, to be used. More specifically, in the embodiment, the optical sighting device 10 is installed to a firearm for long-distance shooting (e.g., a rifle gun, etc.), and enlarges a remote shooting target object, such as a prey, target, etc., for hunting, thereby being visually recognized by the user. In such case, a sighting telescope having a telescopic function, for example, can also be considered as the optical sighting device 10. A scope (e.g., a rifle scope) installed to a firearm, for example, can also be considered as the optical lighting device 10. In addition, in the embodiment, the optical sighting device 10 includes an objective system part 12, an erect system part 14, an eyepiece system part 16, a housing 18, and an adjustment mechanism 20. Except for the points described in the following, the optical sighting device 10 has the same or similar properties as those of the conventional optical sighting device 10. For example, except for the point to be described in the following, as the configuration of each part of the optical sighting device 1, a configuration having the same function as the conventional configuration can be used appropriately.

The objective system part 12, the erect system part 14, and the eyepiece system part 16 are configurations corresponding to the optical system in the optical sighting device 10. With the objective system part 12, which serves as an objective lens side, facing the front side of the firearm and the eyepiece system part 16, which serves as an eyepiece system side, facing the rear side of the firearm, the shooting target is visually recognized by the user as a shooter of the firearm. More specifically, among these, the objective system part 12 is a configuration corresponding to the objective optical system (objective system), and is disposed on a side (objective side) closer to the target object than the erect system part 14 with respect to the target object that is the object as a sighting target, and forms an inverted image of the target object on a first focal plane (first focal plane). Regarding the first focal plane, for example, it can be considered as a focal plane set at a predetermined first position in the optical axis direction in the optical sighting device 10. In addition, in the embodiment, the objective system part 12 has multiple lenses 102, 104, 106, and a lens holder 132. In such case, regarding the lenses 102, 104, 106 in the objective system part 12, for example, it can be considered as objective lenses, etc., in the optical sighting device 10. In addition, the lens holder 132 is a cylindrical body (cylindrical member) holding at least a portion of the lenses in the objective system part 12. Regarding the lens holder 132, for example, it can be considered as a cylindrical body, etc., in which the axial direction and the optical axis direction of the optical sighting device 10 are parallel to each other and which is disposed in the housing 18. In the embodiment, the lens holder 132 is an example of a cylindrical body different from a movable cylinder 134 in the erect system part 14, disposed at a position adjacent to the erect system part 14, and holds the lens 106 disposed at a position closest to the erect system part 14. In this case, other lenses in the objective system part 12 are held by the housing 18. In addition, the objective system part 12 may be further provided with a lens holder for other lenses.

The erect system part 14 is a configuration corresponding to the erect optical system (erect system), disposed between the objective system part 12 and the eyepiece system part 16, and forms, on a second focal plane, an erect image obtained by reversing the inverted image formed on the first focal plane. Regarding the second focal plane, for example, it can be considered as a focal plane, etc., set at a predetermined second position in the optical axis direction in the optical sighting device 10. In addition, in the embodiment, the erect system part 14 has multiple lenses 112, 114, 116, and a movable cylinder 134. In this case, the multiple lenses 112, 114, 116 are arranged between the first focal plane and the second focal plane, and form an erect image on the second focal plane, the erect image being formed by reversing the inverted image formed on the first focal plane. The movable cylinder 134 is a cylindrical body holding the lenses 112, 114, 116. Also, in the embodiment, the movable cylinder 134 is an example of the erect system cylinder, and, in the housing 18, is arranged so that the axial direction changes in accordance with the operation of the user with respect to the adjustment mechanism 20. More specifically, in the movable cylinder 134, the tilting of the axial direction is changed by moving the end part on the side of the objective system part 12 in the upper-lower direction and the left-right direction by using the predetermined position on the side of the eyepiece system part 16 as a fulcrum. In such case, regarding the movable cylinder 134, it can be considered as forming a structure that tilts inside the body of the optical sighting device 10 by using the end part on the side of the eyepiece system part 16 as a fulcrum. Regarding the upper-lower direction and the left-right direction, it can be considered as the upper-lower direction and the left-right direction, etc., when the optical sighting device 10 installed to the firearm is in use, for example. In addition, in FIG. 1A, the upper-lower direction in the drawing corresponds to the upper-lower direction of the optical sighting device 10. In addition, a direction orthogonal to the paper surface of the drawing and the upper-lower direction corresponds to the left-right direction of the optical sighting device 10. In addition, in the embodiment, the erect system part 14, for example, changes the magnification of the optical sighting device 10 by moving at least a portion of the lenses 112, 114, 116 in the axial direction of the movable cylinder 134. In such case, the erect system part 14, for example, changes the magnification in accordance with the operation of the user with respect to the operation part for magnification adjustment in the optical sighting device 10, for example. Also, in such case, regarding the lenses in the erect system part 14, for example, it can be considered as a lens group, etc., that reverses the inverted image formed on the first focal plane into an erect image and adjusts the magnification. In addition, regarding the movable cylinder 134, it can be considered as a cylinder into which the lens group is entered, for example. In addition, the eyepiece system part 16 is a configuration corresponding to the eyepiece optical system (eyepiece system), arranged on a side (eyepiece side) close to the user than the erect system part 14, and allows the user to visually recognize the erect image formed on the second focal plane. In the embodiment, the eyepiece system part 16 has multiple lenses 122, 124. Regarding the lenses 122, 124 in the eyepiece system part 16, for example, it can be considered as an eyepiece lens, etc., in the optical sighting device 10.

In addition, the housing 18 is a housing accommodating the objective system part 12, the erect system part 14, and the eyepiece system part 16, etc. In the embodiment, the housing 18 is fixed and installed to a predetermined position in the firearm by using a mount not shown in the drawings, for example. The adjustment mechanism 20 is a mechanism for making adjustment relating to the function of the optical sighting device 10 in accordance with the operation of the user. Regarding the adjustment relating to the function of the optical sighting device 10, for example, it can be considered as an adjustment regarding the optical properties, sighting, etc., of the optical sighting device 10. In addition, more specifically, in the embodiment, the adjustment mechanism 20 shown in the drawings is a mechanism that adjusts the impact position, and makes adjustment with respect to the optical sighting device 10 by making adjustment to tilting the axial direction of the movable cylinder 134 in the erect system part 14 in accordance with the operation of the user. In such case, regarding the adjustment mechanism 20, for example, it can be considered as a mechanism for making adjustment to the erect system part 14. In addition, regarding the adjustment to the impact position, for example, it can be considered as the adjustment to the relationship between the impact point (impact position) of the bullet from the firearm to which the optical sighting device 10 is installed and the optical axis direction of the optical sighting device 10, etc. Regarding the adjustment to the impact position, for example, it can be considered as an adjustment for matching the aim point and the impact point of the firearm, etc. For example, in the embodiment, the adjustment mechanism 20 changes the center of the image visually recognized by the user by tilting the axial direction of the movable cylinder 134, thereby adjusting the impact point. In addition, in FIG. 1, for the case of illustration, regarding the adjustment mechanism 20, only the configuration for adjusting the impact position in the upper-lower direction is mainly illustrated. In addition to the configuration as shown, the adjustment mechanism 20 may further have a configuration for adjusting the impact position in the left-right direction. More specifically, in the embodiment, the adjustment mechanism 20 has the operation part 202, an advancing-retracting shaft 204, and a spring 206, etc., as shown in FIG. 1B, for example. In addition, while the symbol in FIGS. 1A and 1B is omitted, the adjustment mechanism 20 is further provided with a spring fixing part fixing the spring 206 with respect to the lens holder 132 in the objective system part 12. In addition, in these configurations, the operation part 202 receives the operation of the user. In the embodiment, the operation part 202 is a dial that rotates in accordance with the operation of the user. In addition, the advancing-retracting shaft 204 is a member (advancing-retracting member) that advances and retracts in accordance with the operation of the user with respect to the operation part 202 on an end side of the movable cylinder 134 in the erect system part 14. In the embodiment, the advancing-retracting part 204 advances and retracts in accordance with the rotation of the operation part 202 at the end part on the side of the objective system part 12 in the movable cylinder 134. Accordingly, the advancing-retracting shaft 204 changes the position of the end part of the movable cylinder 134.

In FIGS. 1A and 1B, the operation part 202 and the advancing-retracting shaft 204 in the figure are the operation part 202 and the advancing-retracting shaft 204 for adjusting the impact position in the upper-lower direction. In addition, in the embodiment, the adjustment mechanism 20 further includes an operation part 202 and an advancing-retracting shaft 204 for adjusting the impact position in the left-right direction, in addition to the operation part 202 and the advancing-retracting shaft 204 shown in the drawing. In such case, regarding the adjustment mechanism 20, for example, it can be considered as a mechanism having multiple operation parts 202 and advancing-retracting shafts 204. In addition, in such case, regarding the operation part 202 for making adjustment in the upper-lower direction, for example, it can be considered as an elevation dial, etc., for adjusting the impact point in the upper-lower direction. Regarding the operation part 202 for making adjustment in the left-right direction, for example, it can be considered as an elevation dial, etc., for adjusting the impact point in the upper-lower direction. In addition, the operation part 202 for making adjustment in the upper-lower direction in the embodiment is an example of an upper-lower adjustment operation part for receiving from the user an operation for adjusting the impact position in the upper-lower direction. The advancing-retracting shaft 204 for making adjustment in the upper-lower direction is an example of an upper-lower advancing-retracting shaft that is a shaft-like advancing-retracting member advancing and retracting in the upper-lower direction in accordance with the operation of the user with respect to the upper-lower adjustment operation part. In addition, the operation part 202 for making adjustment in the left-right direction is an example of a left-right adjustment operation part for receiving from the user an operation for adjusting the impact position in the left-right direction. The advancing-retracting shaft 204 for making adjustment in the left-right direction is an example of a left-right advancing-retracting shaft that is a shaft-like advancing-retracting member that advances and retracts in the left-right direction in accordance with the operation of the user with respect to the left-right adjustment operation part.

In addition, in the adjustment mechanism 20, the spring 206 biases the movable cylinder 134 toward the advancing-retracting shaft 204. Accordingly, the spring 206 presses the movable cylinder 134 toward the advancing/retracting shaft 204. In such configuration, for example, through an operation of moving the advancing-retracting shaft 204 toward the movable cylinder 134, the end side of the movable cylinder 134 can be pressed by the advancing-retracting shaft 204 to appropriately tilt the axial direction of the movable cylinder 134. In such case, when the advancing-retracting shaft 204 retracts, by biasing the movable cylinder 134 toward the advancing-retracting shaft 204 by using the spring 206, for example, the axial direction of the movable cylinder 134 can be changed by matching the movement of the advancing-retracting shaft 204. Therefore, according to such configuration, for example, the tilting of the axial direction of the movable cylinder 134 can be adjusted appropriately. In addition, in the embodiment, as the spring 206, a double torsion spring. In such case, as the spring 206, for example, a spring same as or similar to the conventional double torsion spring can be used appropriately. Regarding the double torsion spring, for example, it can be considered as a spring with a configuration in which multiple torsion coil springs are combined in series. In addition, regarding the double torsion spring, for example, it can be considered as a spring having multiple coil parts that are portions around which wires of coil springs are wound. Regarding the double torsion spring, for example, it can be considered as a spring which has multiple coil parts and in which portions between the coil parts are bent. In addition, in the embodiment, the spring 206 is a spring having two coil parts and the portion between the coil parts is bent. In the case where the double torsion spring of such configuration is used, for example, through acting of a torsional moment to two coil parts simultaneously, for the torque generated at the same torsion angle, the coil part can be considered as becoming twice as one torsion coil spring. In addition, the double torsion spring, for example, may also be referred to as a double kick spring.

In addition, in the embodiment, the spring 206 is commonly used for adjustment to the impact position in the upper-lower direction and the left-right direction. In such case, regarding the spring 206, for example, the movable cylinder 134 can be considered as being biased with respect to both of the advancing-retracting shaft 204 for the adjustment in the upper-lower direction and the advancing-retracting shaft 204 for the adjustment in the left-right direction. Regarding the spring 206 biasing the movable cylinder 134 with respect to the advancing-retracting shaft 204 for the adjustment in the upper-lower direction, for example, it can be considered as biasing, by using the spring 206, the movable cylinder 134 so that the tilting of the movable cylinder 134 changes by matching the movement of the advancing-retracting shaft 204 when the advancing-retracting shaft 204 retracts, for example. Regarding the spring 206 biasing the movable cylinder 134 with respect to the advancing-retracting shaft 204 for the adjustment in the left-right direction, for example, it can be considered as biasing, by using the spring 206, the movable cylinder 134 so that the tilting of the movable cylinder 134 changes by matching the movement of the advancing-retracting shaft 204 when the advancing-retracting shaft 204 retracts, for example, can be considered. According to such configuration, for example, at the time of adjusting the impact position in both of the upper-lower direction and the left-right direction, the movable cylinder 134 can be biased appropriately. In addition, in such case, by using a double torsion spring as the spring 206, for example, a spring with high resilience can be used appropriately. In addition, in such case, for example, by bringing the spring 206 into contact with the movable cylinder 134 in a wide range, the biasing with respect to the movable cylinder 134 can be carried out. Therefore, according to the embodiment, for example, the biasing in multiple directions can be carried out appropriately with respect to the movable cylinder 134.

Figure 2A:
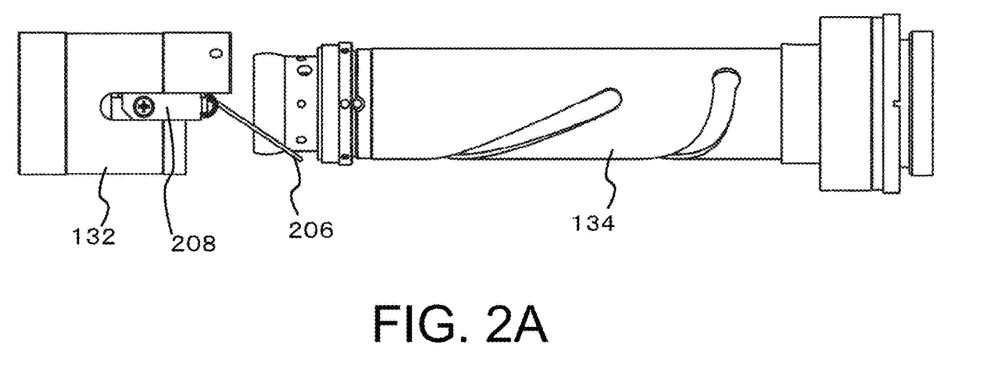
FIG. 2A is a view illustrating an example of a way of biasing a movable cylinder 134 by using a spring 206.
Figure 2B:
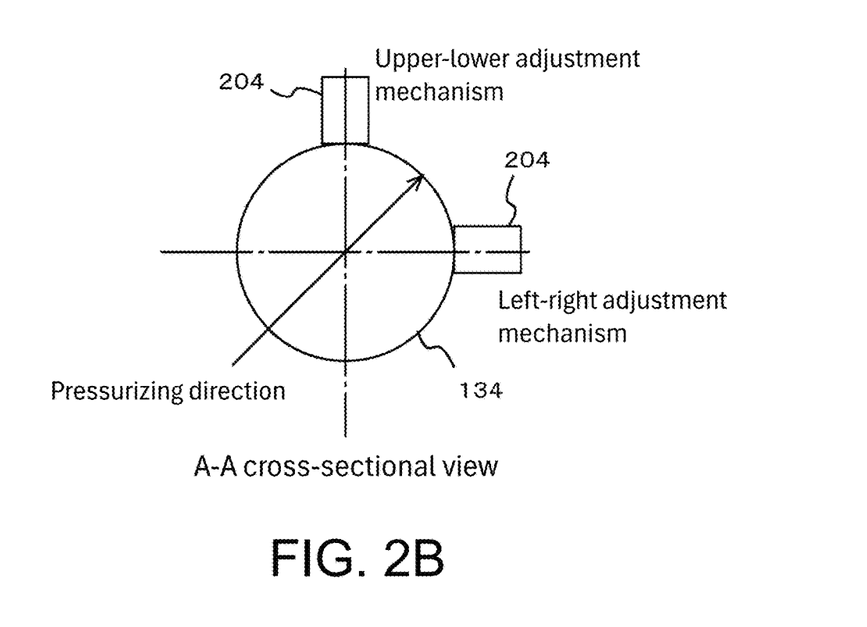
FIG. 2B is an A-A cross-sectional view in which the cross-section at the position indicated by using the dot-chain line in FIG. 1A is simplified and shown.

Then, the function of the spring 206, etc., in the adjustment mechanism 20 can be described in greater detail. FIGS. 2A and 2B are views illustrating the adjustment mechanism 20 in greater detail. FIG. 2A is a view illustrating an example of a way of biasing a movable cylinder 134 by using a spring 206. FIG. 2B is an A-A cross-sectional view in which the cross-section at the position indicated by using the dot-chain line in FIG. 1A is simplified and shown. As described above, in the embodiment, the tilting of the movable cylinder 134 changes in accordance with the advancing and retracting of the advancing-retracting shaft 204 in the adjustment mechanism 20. By biasing the movable cylinder 134 toward the advancing-retracting shaft 204 by using the spring 206 when the advancing-retracting shaft 20 retracts, for example, the axial direction of the movable cylinder 134 is changed by matching the movement of the advancing-retracting shaft 204, for example. In such case, regarding the spring 206, for example, it can be considered as keeping the tilting of the movable cylinder 134 in accordance with the position of the advancing-retracting shaft 204 by biasing the movable cylinder 134, for example.

In addition, in the embodiment, the spring 206 is fixed to the lens holder 132 in the objective system part 12 (see FIGS. 1A, 1B) by using the spring fixing part 208, so that the portion between the two coil parts contacts an end of the movable cylinder 134, as shown in FIG. 2A. In this case, regarding the lens holder 132, for example, it can be considered as a cylindrical body, etc., arranged at a position adjacent to the movable cylinder 134. In addition, for the case of illustration, in FIGS. 1A, 1B, and 2A, regarding the spring 206, it is shown that the movable cylinder 134 is pressed (pressurized) from the lower part to the upper part in the upper-lower direction. However, as described above, in the embodiment, the spring 206 is commonly used for the adjustment in both the upper-lower direction and the left-right direction. Therefore, in the actual configuration, the spring 206 obliquely presses the movable cylinder 134, so that the movable cylinder 134 is biased toward the advancing-retracting shaft 204 in both the upper-lower direction and the left-right direction as shown as the pressurizing direction in FIG. 2B, for example. More specifically, in FIG. 2B, an example of the position relationship between the movable cylinder 134 and the advancing-retracting shaft 204 when viewed from the eyepiece side and the pressurizing direction in which the spring 206 presses the movable cylinder 134 is shown. In such case, regarding the pressurizing direction, for example, it can be considered as pressurizing from 45 degrees diagonally downward to the left to 45 degrees diagonally upward to the right in the drawing. According to such configuration, for example, the movable cylinder 134 can be biased appropriately by the spring 206.

Here, at the time of adjusting the impact position, the greater the amount (range) in which the movable cylinder 134 can be tilted, the greater the adjustment width, which is the range in which the impact point can be adjusted. In addition, in this case, when the adjustment width becomes wider, it is possible to shoot in a wider range by using the optical sighting device 10. Therefore, the adjustment width of the impact point may normally be greater. Meanwhile, in order to increase the adjustment width of the impact point, it is necessary to greatly tilt the movable cylinder 134 inside (in the inner space of the body) of the housing of the optical sighting device 10. In addition, in such case, the load with respect to the spring 206 holding the tilting of the movable cylinder 134 also increases.

Regarding this point, as the spring holding the tilting of the movable cylinder 134, a plate spring, etc., can be considered in addition to a double torsion spring, for example. However, in such case, the resilience (repulsive force, reaction force) of the spring weakens, and an issue such as the inability of appropriately holding the movable cylinder 134 may easily occur. Comparatively, in the embodiment, in the case where the double torsion spring is used as the spring 206, the resilience of the spring 206 can appropriately exceed the case where a plate spring, etc., is used. Accordingly, for example, the movable cylinder 134 can be held more appropriately. In this case, by using the spring 206 having resilience higher than a plate spring, etc., for example, it is possible to widen the range in which the movable cylinder 134 is able to tilt. Accordingly, for example, regarding the adjustment for the optical sighting device 10, it is possible to have a large adjustment width. Therefore, according to the embodiment, the optical sighting device 10 can be adjusted appropriately, for example. In addition, regarding the way of installing the spring 206 with respect to the optical sighting device 10, for example, an installation method able to more appropriately exert the properties of the double torsion spring may be adopted. More specifically, as described above, in the embodiment, the spring 206 is fixed to the lens holder 132 in the objective system part 12 by using the spring fixing part 208. In addition, in this case, as shown in FIGS. 3A, 3B, 4A, and 4B, the spring 206 is fixed to the lens holder 132.

Figure 3A:
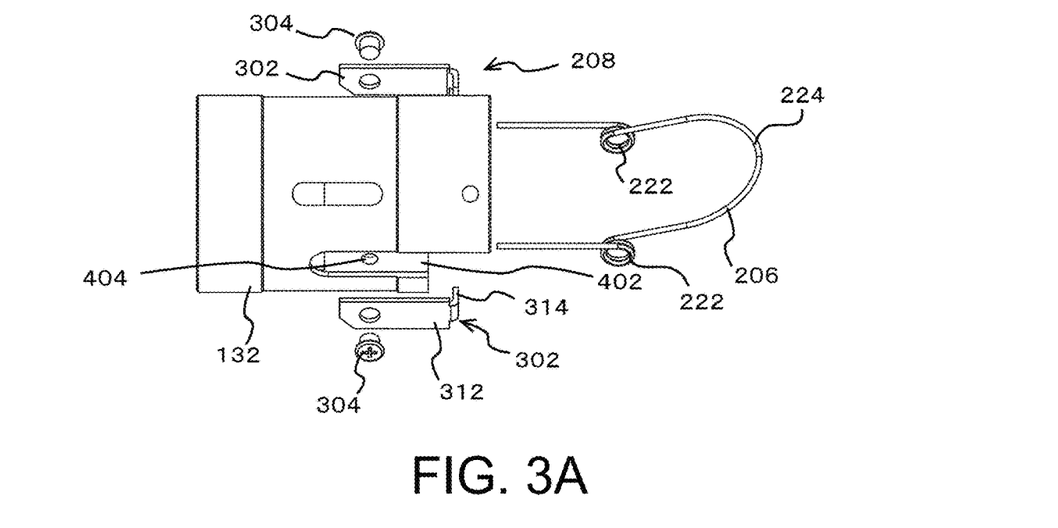
FIG. 3A is an exploded perspective view illustrating an example of a configuration of a spring fixing part 208 of the embodiment together with a lens holder 132 and the spring 206.
Figure 3B:
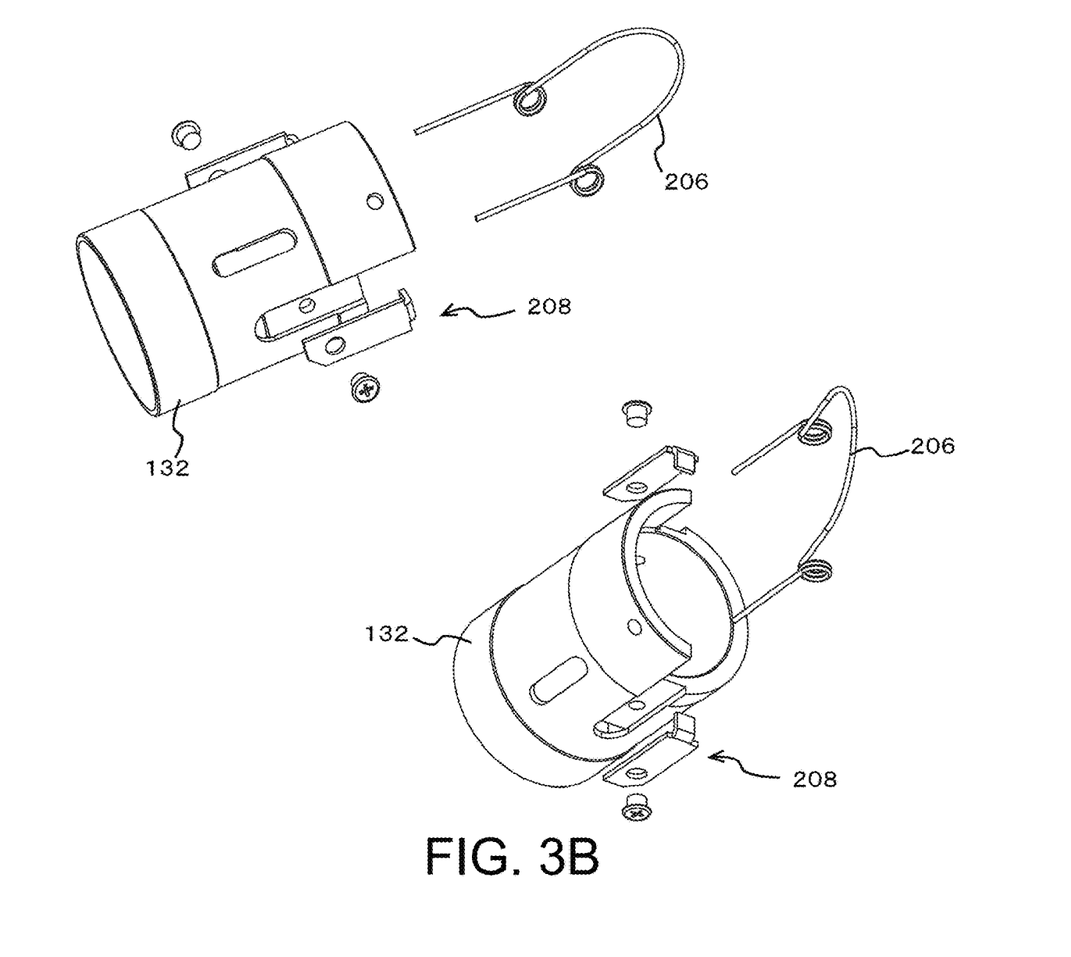
FIG. 3B is an exploded perspective view illustrating the configuration shown in FIG. 3A from a perspective different from the perspective of FIG. 3A.
Figure 4A:
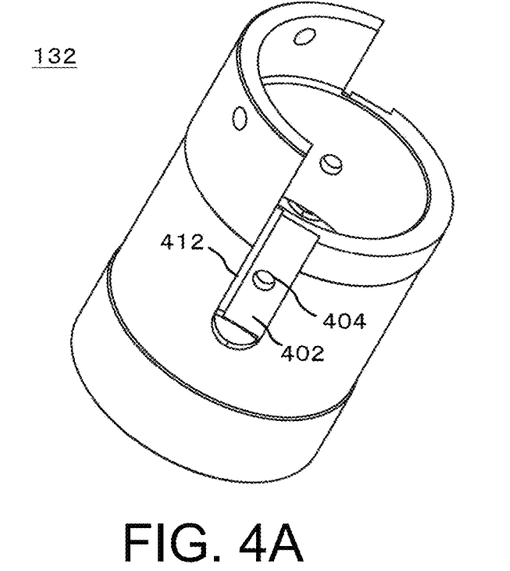
FIG. 4A is a perspective view illustrating an example of a configuration of the lens holder 132.
Figure 4B:
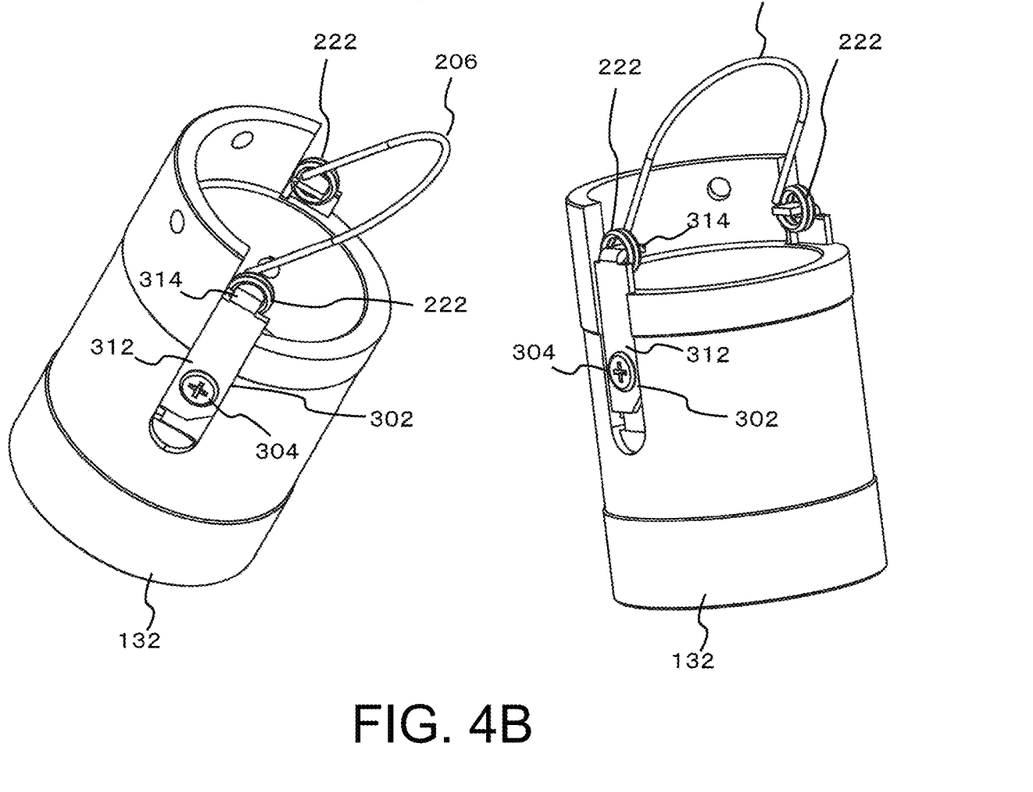
FIG. 4B is a perspective view illustrating a state in which the spring 206 is installed to the lens holder 132 from multiple perspectives.

FIGS. 3A, 3B, 4A and 4B are views illustrating an example of how the spring 206 is installed. FIG. 3A is an exploded perspective view illustrating an example of a configuration of a spring fixing part 208 of the embodiment together with a lens holder 132 and the spring 206. FIG. 3B is an exploded perspective view illustrating the configuration shown in FIG. 3A from a perspective different from the perspective of FIG. 3A. FIG. 4A is a perspective view illustrating an example of a configuration of the lens holder 132. FIG. 4B is a perspective view illustrating a state in which the spring 206 is installed to the lens holder 132 from multiple perspectives.

In the embodiment, the spring fixing part 208 has multiple fulcrum plates 302 and multiple screws 304. In this case, the spring fixing part 208 has the fulcrum plate 302 for an end and the other end of the spring 206. In addition, the spring fixing part 208 has the screw 304 corresponding to each of the fulcrum plates 302. The fulcrum plate 302 is a plate-shaped body as an example of a spring end fixing plate, and is fixed to the outer surface of the lens holder 132. Regarding the outer surface of the lens holder 132, for example, it can be considered as a surface, etc., corresponding to the side surface of the cylindrical body, for example. The lens holder 132 is an example of a spring fixing cylindrical body. More specifically, on each of an end side and the other side of the spring 206, the fulcrum plate 302 is fixed to the outer surface of the lens holder 132 by sandwiching the end of the spring 206 with the outer surface of the lens holder 132. In addition, in the embodiment, the fulcrum plate 302 has a plate-shaped part 312 and a protrusion part 314. The plate-shaped part 312 is a plate-shaped portion fixed along the outer surface of the lens holder 132. In this case, for example, the plate-shaped part 312 can be considered as having a cylindrical body side surface as a surface facing toward the side of the lens holder 132 when the plate-shaped part 312 is fixed to the lens holder 132 and an outer side surface as a surface on the back side of the cylindrical body side surface. In addition, in the embodiment, a screw hole is formed on the plate-shaped part 312. The screw hole penetrating through from the outer side surface toward the cylindrical body side surface. The screw hole, for example, can be considered as a hole, etc., for the screw 304 to pass through. In addition, the protrusion part 314 is a portion protruding from the plate-shaped part 312. In the embodiment, the protrusion part 314 protrudes in a direction toward the inner side of the lens holder 132 with respect to the plate-shaped part 312. In addition, in this case, the fulcrum plate 302 is fixed to the outer surface of the lens holder 132 in a state in which the protrusion part 314 is inserted into the coil part 222 of the spring 206, as shown in FIG. 4B. According to the configuration, for example, by using the fulcrum plate 302, the coil part 222 serving as the fulcrum (rotational fulcrum) of the spring 206 can be fixed appropriately. In addition, in this case, the protrusion part 314, for example, can be considered as serving as a guide rod with respect to the spring 206. The multiple screws 304 are fixing members for fixing the multiple fulcrum plates 302 on the outer surface of the lens holder 132. In the embodiment, the screw 304 is inserted from the side of the outer side surface of the plate-shaped part 312 with respect to the screw hole in the plate-shaped part 312 of the fulcrum plate 302. According to such configuration, for example, the fulcrum plate 302 can be fixed to the lens holder 132 appropriately. Accordingly, for example, the spring 206 can be fixed appropriately with respect to the lens holder 132.

Regarding the way of fixing the spring 206 with respect to the lens holder 132, more specifically, in the embodiment, a concave part 402 and a hole 404 are formed on the outer surface of the lens holder 132, as shown in FIG. 4A, for example. In this case, at the time of fixing the fulcrum plate 302 to the lens holder 132, the concave part 402 accommodates the plate-shaped part 312 of the fulcrum plate 302. According to such configuration, for example, the fulcrum plate 302 can be fixed to the lens holder 132 appropriately without protrusion of the fulcrum plate 302 from the outer surface of the lens holder 132. In addition, by forming the concave part 402 on the outer surface of the lens holder 132, for example, the fulcrum plate 302 can be easily and appropriately installed to the correct position. In addition, the hole 404 is a hole into which the screw 304 is inserted when the fulcrum plate 302 is fixed. In the embodiment, the hole 404 is formed, on the bottom surface of the concave part 402, at a position corresponding the screw hole in the plate-shaped part 312 of the fulcrum plate 302. According to such configuration, for example, the fulcrum plate 302 can be fixed to the lens holder 132 appropriately. The hole 404 may also be a hole in which a female screw corresponding to the screw 304 is formed.

In addition, as shown in FIG. 4A, in the embodiment, a groove part 412 is further formed on the bottom surface of the concave part 402. In such case, regarding the configuration of the concave part 402, for example, it can be considered that a second concave part corresponding to the groove part 412 is formed in a first concave part corresponding to the concave part 412 itself. In addition, in the embodiment, the groove part 412 is a concave part for accommodating the end part of the spring 206. In such case, at the time of fixing the spring 206 by using the spring fixing part 208, an end part of the spring 206 is inserted into the groove part 412. In addition, in a state in which the end part of the spring 206 is inserted into the groove part 412, the fulcrum plate 302 is installed to the concave part 402 so as to cover the groove part 412 by using the plate-shaped part 312. According to such configuration, for example, using the fulcrum plate 302, the end part of the spring 206 can be reliably fixed with respect to the lens holder 132. In addition, in the embodiment, the groove part 412 is formed at a position at an end of the concave part 402, so that a wall surface of the groove part 412 is connected with the wall surface of the concave part 402. More specifically, in such case, for example, regarding the wall surface on a side against which the end part of the spring 206 is pressed at the biasing time when the movable cylinder 134 (see FIGS. 1A and 1B) is biased by the spring 206, the wall surface of the concave part 402 and the wall surface of the groove part 412 are connected. In such case, for example, it can be considered that a wall surface of the groove 412 is included and becomes the wall surface of the concave part 402. In such case, at the time of biasing by using the spring 206, the end of the spring 206 is pressed against the wall surface of the concave part 402, for example. Therefore, according to the configuration, for example, at the time of biasing by using the spring 206, the position of the end of the spring 206 can be appropriately fixed at a predetermined position by using the wall surface of the concave part 402. Accordingly, for example, the movable cylinder 134 can be more appropriately biased by using the spring 206.

Regarding the positions where the fulcrum plates 302 are fixed, in the embodiment, the fulcrum plates 302 are fixed to an end side and the other side of the diameter of a circle of the cross-section of the lens holder 132, as shown in the figure. In this case, the circle of the cross-section of the lens holder 132, for example, can be considered as a circle, etc., of a cross-section orthogonal to the axial direction of the lens holder 132. In addition, regarding the circle of the cross-section can be considered as a circle, etc., similar to the cross-sectional shape of the lens holder 132, for example. In addition, regarding the circle, for example, it can be considered as a circle, etc., with the position of the optical axis of the lens held by the lens holder 132 as the center on a cross-section orthogonal to the optical axis. In such case, regarding the fulcrum plates 302 fixed to an end side and the other end side of the diameter of the circle, for example, it can be considered that the fulcrum plates 302 are fixed so that a line passing through the center of the circle on the cross-section intersects with the fulcrum plates 302, etc. In such case, the fulcrum plate 302 used for fixing at an end of the spring 206 and the fulcrum plate 302 used for fixing at the other end of the spring 206, for example, can be considered as being fixed at positions facing each other by sandwiching the center of the circle of the cross-section. According to the configuration, for example, the function of the double torsion spring used as the spring 206 can be more appropriately exerted. In addition, by using the double torsion spring as the spring 206, for example, the distance between the fulcrum of the spring 206 and the acting point can be appropriately increased without blocking the optical path in the optical sighting device 10 (see FIGS. 1A and 1B), for example. In this way, for example, the range in which the movable cylinder 134 is able to tilt can be more appropriately increased. Therefore, according to the embodiment, for example, the spring 206 can be more appropriately fixed with respect to the lens holder 132. In such case, for example, it can be considered that the double torsion spring is used as the spring 206, and the fulcrum plates 302 on the end side and the other end side of the diameter of the circle of the cross-section of the lens holder 132 are fixed, thereby being able to more appropriately using a spring with high resilience force. In such case, for example, by fixing the end and the other end of the spring 206 at multiple positions separated by a distance, distortion, etc., can be prevented from occurring in the lens holder 132.

As can be understood from the configuration of the spring 206, etc., as shown in FIG. 3A, in the embodiment, the spring 206 contacts the movable cylinder 134 at a contact part 224 that is a portion between the two coil parts 222. In addition, in this case, with the fulcrum plates 302 being fixed to the end side and the other end side of the diameter of the circle of the cross-section of the lens holder 132, for example, the range serving as the contact part 224 can be sufficiently ensured. Accordingly, for example, one spring 206 can be more appropriately used for the adjustment in both the upper-lower direction and the left-right direction. Moreover, as described above, in the embodiment, an end of the spring 206 is fixed to the position of the wall surface of the concave part 402 of the lens holder 132. In addition, the wall surface of the concave part 402 is a wall surface on the side against which the end of the spring 206 is pressed at the time of biasing by using the spring 206. In addition, in such case, at the time of biasing, it can be considered as a configuration, etc., in which the end of the spring 206 and the contact part 224 are located on opposite sides with respect to the diameter of the cross-section where the fulcrum plates 302 are located at two ends. In such case, regarding the end of the spring 206 and the contact part 224 being on opposite sides with respect to the diameter, such as the corresponding relationship of semi-circles in the case where the circle is split into two by the diameter, it can be considered as that the position of the end of the spring 206 is at a position corresponding to a semi-circle, and the position corresponding to the contact part 224 is at a position corresponding to the other semicircle, etc. Regarding the diameter of the cross-section on which multiple fulcrum plates 302 are located at the two ends, for example, it can be considered as a diameter, etc., in which the diameter or its extension line passes through a predetermined reference position in the fulcrum plates 302. The reference position of the fulcrum plates 302, for example, can be considered as a predetermined position for a common fulcrum plate 302 with respect to the two fulcrum plates 302. Regarding the end of the spring 206 and the contact part 224 being on opposite sides with respect to the diameter at the time of biasing, for example, it can be considered that the end of the spring 206 and the contact part 224 are on opposite sides, etc., with respect to a plane including the diameter and being parallel to the optical axis of the optical sighting device 10. In addition, with the required resilience in the spring 206 or the configuration of the optical sighting device 10, etc., the position where the end of the spring 206 is fixed can also be considered as a position on the same side with the contact part 224 at the time of biasing, being located on the diameter, etc., for example. In such case as well, by using a double torsion spring as the spring 206, the distance between the fulcrum of the spring 206 and the acting point can be appropriately increased.

Here, regarding the spring that biases the movable cylinder 134, for example, in the case where solely the biasing of the movable cylinder 134 is considered, a plate spring, etc., can be considered, instead of using a double torsion spring. However, in the case where the plate spring is used, the position of fixing the spring to the cylindrical body, such as the lens holder 132, is generally located on the outer side of the position where the plate spring contacts the movable cylinder 134 in the direction of the force with which the plate spring biases the movable cylinder 134. In addition, in such case, the spring may easily fall off due to the force applied by the spring (plate spring) at the time of biasing. Comparatively, in the configuration of the embodiment, regarding the orientation of the force received by the screw 304 used for fixing the fulcrum plate 302 of the spring fixing part 208, it can be considered as a direction different from the insertion direction of the screw 304, for example. More specifically, regarding the orientation of the force received by the screw 304 at the time of biasing, for example, it can be considered as a direction orthogonal to the insertion direction of the screw 304, for example. In addition, in such case, even if force is applied to the screw 304 at the time of biasing, the screw 304 is unlikely to fall off. Therefore, according to the embodiment, for example, the fulcrum plate 302 can be appropriately prevented from falling off, etc., under the influence of the force at the time of biasing. In the case where a plate spring, etc., is used, in order to prevent the spring from falling off, it suffices as long as a sufficiently long screw is used to fix the plate spring, etc. However, in the case where a screw is fixed to a cylindrical body, such as the lens holder 132, in association with the optical path of the optical sighting device 10, if a long screw, etc., is used, an influence on the optical path, etc., may occur due to the projection of the tip of the screw into the cylindrical body. Comparatively, according to the embodiment, for example, even if the short screw 304 is used, the spring 206 can be appropriately fixed to the lens holder 132, etc.

Figure 5A:
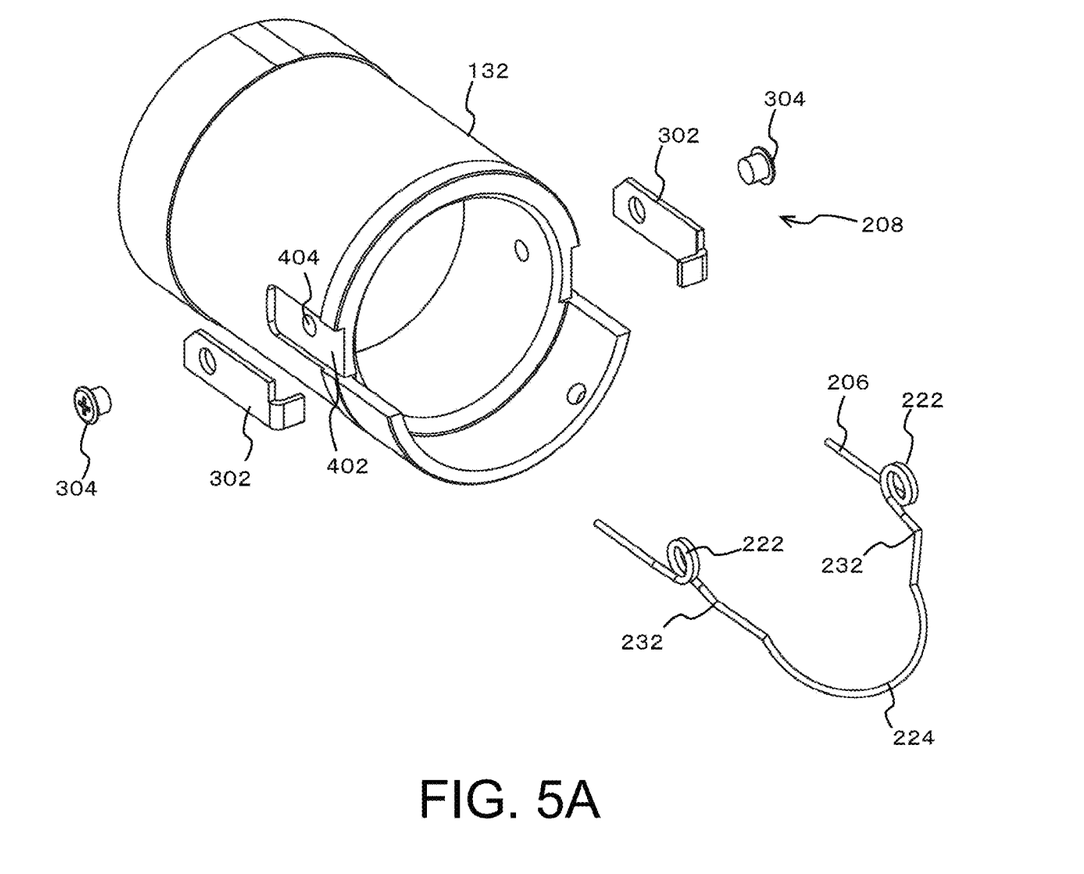
FIG. 5A is an exploded perspective view illustrating an example of a configuration of the spring 206 of the modified example together with the lens holder 132 and the spring fixing part 208.
Figure 5B:
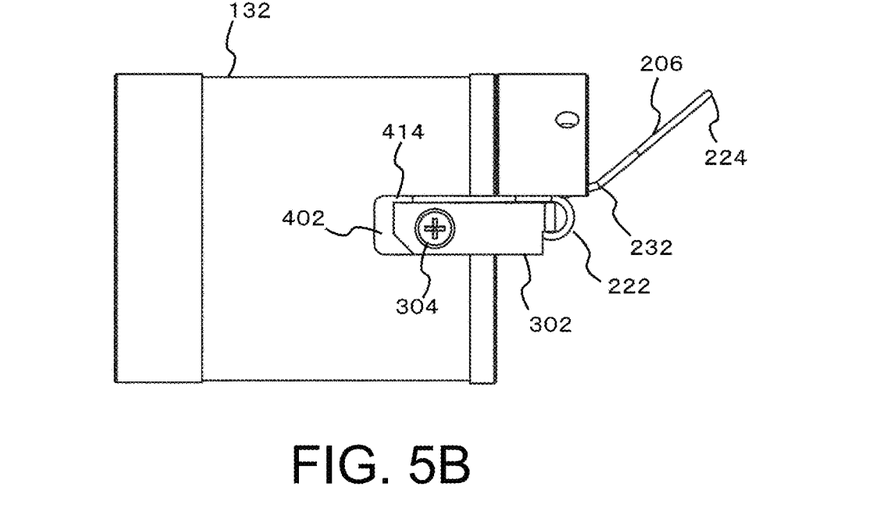
FIG. 5B is a perspective view illustrating an example of a way of fixing the spring 206 in the modified example.

In addition, the specific configuration of the optical sighting device 10 is not limited to the configuration described above, and various changes are possible. In this case, for example, regarding the specific configuration of the spring 206, the way of fixing the spring 206, etc., a configuration different from the configuration described above and shown in FIGS. 5A and 5B can be considered. FIGS. 5A and 5B are views illustrating a modified example of the configuration and a way of fixing the spring 206. FIG. 5A is an exploded perspective view illustrating an example of a configuration of the spring 206 of the modified example together with the lens holder 132 and the spring fixing part 208. FIG. 5B is a perspective view illustrating an example of a way of fixing the spring 206 in the modified example. Except for the points described below, components in FIGS. 5A and 5B that are given the same reference numerals as in FIGS. 1A to 4B may have the same or similar features as the components in FIGS. 1A to 4B. In addition, in the modified example with further changes to the configuration of the spring 206 or how the spring 206 is fixed, only some of the properties described below may be different from the configuration described using FIGS. 1A to 4B.

In the modified example, as shown in FIG. 5A, for example, the spring 206 has a bent part 232 in a portion between the coil 222 and the contact part 224. The bent part 232 is a portion bent in a predetermined direction in the spring 206. For example, as shown in FIG. 5B, the bent part 232 is bent in a direction from the spring 206 toward the movable cylinder 134 at the time of biasing with respect to the movable cylinder 134 (see FIGS. 1A and 1B). By using the spring 206 having the bent part 232, for example, the resilience of the spring 206 can be appropriately increased. In addition, at the time when the advancing-retracting shaft 204 (see FIGS. 1A and 1B) in the adjustment mechanism 20 retracts, the biasing with respect to the movable cylinder 134 due to the spring 206 can be carried out more appropriately even in the case where the advancing-retracting shaft 204 further retracts. Therefore, according to such configuration, for example, the range (movable region) in which the movable cylinder 134 is tilted at the time of adjustment can be more appropriately increased. In addition, in the spring 206 of the modified example, as shown in FIG. 5A, the contact part 224 is further curved by being fit with the shape of the movable cylinder 134. In such case, for example, the contact part 224 can also be considered as being curved into a shape close to the outer diameter of the movable cylinder 134. In the case of such configuration, for example, the range (grounded area) in which the spring 206 makes contact with respect to the movable cylinder 134 can be more appropriately increased. Accordingly, for example, at the time of making adjustment in the upper-lower direction and the left-right direction, an appropriate force (pressurizing force) can be applied from the spring 206 to the movable cylinder 134.

In addition, in the modified example, as shown in FIG. 5B, for example, the way of fixing the spring 206 with respect to the lens holder 132 is also different from the case described above by using FIGS. 4A and 4B, etc. More specifically, in the modified example as well, the concave part 402 and the hole 404 are formed on the outer surface of the lens holder 132. The concave part 402 accommodates the fulcrum plate 302 in the spring fixing part 208, and the hole 404 is provided for the screw 304. However, in the modified example, the groove part 412 (see FIGS. 4A and 4B) on the bottom surface of the concave part 402 is not formed. According to such configuration, for example, the processing with respect to the lens holder 132 can be carried out more easily and appropriately. By doing so, for example, the cost required for processing the lens holder 132, etc., can be reduced.

Moreover, in the modified example, the concave part 402 of the lens holder 132 is formed to be wider than the fulcrum plate 302 as shown in FIG. 5B, for example. In addition, in this way, the concave part 402 accommodates the fulcrum plate 302, so that a gap 414 can be provided between at least one wall surface of the concave part 402 and the fulcrum plate 302 in the circumferential direction of the lens holder 132. In such case, in the state in which the coil part 222 of the spring 206 is inserted into the protrusion part of the fulcrum plate 302 and the end part of the spring 206 is accommodated in the gap 404, the spring 206 is fixed to the lens holder 132. In this case, as can be understood from the configuration as shown, etc., the gap 414 in which the end part of the spring 206 is accommodated is located on the wall surface of the concave part 402 on the side against which the end of the spring 206 is pressed at the time when the movable cylinder 134 is biased by the spring 206. Therefore, in the modified example as well, for example, at the time of biasing by using the spring 206, the position of the end of the spring 206 can be appropriately fixed at a predetermined position by using the wall surface in the concave part 402. Accordingly, for example, the movable cylinder 134 can be more appropriately biased by using the spring 206. In addition, in the case as well, the wall surface of the concave part 402 can be considered as a portion of the outer surface of the lens holder 132. Therefore, in the case as well, the fulcrum plate 302 can be considered as being fixed to the outer surface of the lens holder 132 by sandwiching the end of the spring 206 with the outer surface of the lens holder 132, for example.

In the following, the supplementary description relating to the configuration described above and additional modified examples are described. For case of description, hereinafter, the present example may be used to include the modified examples described above or below. As described above, in the adjustment mechanism 20, for example, by using the screw fixing part 208, the end and the other end of the spring 206 are fixed with respect to the lens holder 132 as a cylindrical body different from the movable cylinder 134. According to the configuration, for example, the double torsion spring used as the spring 206 can be appropriately fixed to a position able to bias the movable cylinder 134. In addition, in such case, by fixing the spring 206 to the lens holder 132, for example, the number of components forming the optical sighting device 10 can be prevented from excessively increasing, and the spring 206 can be appropriately fixed. Comparatively, in the modified example of the configuration of the optical sighting device 10, the end and the other end of the spring 206 may also be fixed to a cylindrical body other than the lens holder 132. In such case, the cylindrical body, for example, can be considered as an example of a spring fixing cylindrical body. In addition, in such case, as the cylindrical body fixing the end and the other end of the spring 206, for example, it can be considered as a cylindrical body arranged on the objective side with respect to the first focal plane in the optical sighting device 10. Accordingly to the configuration, the position of fixing the spring 206 can be determined more flexibly. In this way, for example, the degree of freedom for designing the optical sighting device 10 can be increased.

In addition, as described above, the double torsion spring, for example, can be considered as a spring with multiple coil parts. In such case, in the modified example in which the double torsion spring is used as the spring 206 that biases the movable cylinder 134, for example, it can be considered as a double torsion spring formed by combining multiple torsion springs (single torsion springs) with one coil portion. More specifically, in such case, for example, a configuration in which two single torsion springs are connected directly or via a component can be considered as a double torsion spring. In the case of being configured in this way, for example, regarding the double torsion spring, by using the same or similar configuration as described above, the same or similar effects can be obtained appropriately.

In addition, the properties of the embodiments described above can be considered, for example, as the properties of the installation mechanism of the double torsion spring in the optical sighting device 10 of a riflescope or the like. In addition, the properties can be considered as corresponding to the properties of the adjustment method of the optical sighting device 10. In such case, regarding the method for adjusting the optical sighting device 10, it can be considered as a method for making adjustment while biasing the movable cylinder 134 by using a double torsion spring, etc. Regarding the adjustment performed for the optical sighting device 10, the adjustment to the impact position is described mainly. Regarding this, in the optical sighting device 10, adjustments other than the adjustment to the impact position may also be further performed. In such case, for example, the optical sighting device 10 further includes an adjustment mechanism relating to adjustments other than the adjustment to the impact position. In addition, as such adjustment mechanism, the optical sighting device 10, for example, may further include an adjustment mechanism for adjusting the magnification ratio, an adjustment mechanism for adjusting the focus, an adjustment mechanism for adjusting illumination, etc.

INDUSTRIAL UTILITY

The invention can be appropriately used in an optical sighting device, etc., for example.

What is claimed is:

1. An optical sighting device, installed to a firearm to be used, the optical sighting device comprising:
    an objective system part, forming an inverted image of a target object serving as a target of sighting on a first focal plane;
    an erect system part, forming an erect image obtained by reversing the inverted image on a second focal plane; and
    an adjustment mechanism, performing adjustment with respect to the erect system part,
    wherein the erect system part has:
    a lens, arranged between the first focal plane and the second focal plane; and
    an erect system cylinder, as a cylindrical body holding the lens,
    wherein the adjustment mechanism is a mechanism that performs adjustment to tilting an axial direction of the erect system cylinder, and has:
    an advancing-retracting member that advances and retracts on an end side of the erect system cylinder; and
    a double torsion spring, biasing the erect system cylinder toward the advancing-retracting member.

2. The optical sighting device as claimed in claim 1, wherein the adjustment mechanism further has a spring fixing part, fixing an end and an other end of the double torsion spring to a cylindrical body different from the erect system cylinder.

3. The optical sighting device as claimed in claim 2, wherein the different cylindrical body is a lens holder holding at least a portion of a lens in the objective system part.

4. The optical sighting device as claimed in claim 2, wherein the spring fixing part has a spring end fixing plate for each of the end and the other end of the double torsion spring,
    the spring end fixing plate is a plate-shaped body fixed to an outer surface of a spring fixing cylindrical body that is the different cylindrical body by sandwiching the end of the double torsion spring with an outer surface of the spring fixing cylindrical body,
    the spring end fixing plate has:
    a plate-shaped part is a plate-shaped portion fixed along the outer surface of the spring fixing cylindrical body; and
    a protrusion part, protruding from the plate-shaped part, and in a state in which the protrusion part is inserted into a coil part, which is a portion on which a wiring material is wound, in the double torsion spring, the spring end fixing plate is fixed to the outer surface of the spring fixing cylindrical body.

5. The optical sighting device as claimed in claim 4, wherein the spring fixing part further has a screw fixing the plate-shaped part of the spring end fixing plate onto the outer surface of the spring fixing cylindrical body, the plate-shaped part has: a cylindrical body side surface, which is a surface facing a side of the spring fixing cylindrical body at a time of being fixed to the spring fixing cylindrical body; and an outer side surface, which is a surface on a back side of the cylindrical body side surface, and a screw hole penetrating through from the outer side surface toward the cylindrical body side surface is formed as a hole through which the screw passes, and the screw is inserted into the screw hole from a side of the outer side surface in the plate-shaped part.

6. The optical sighting device as claimed in claim 4, wherein a concave part accommodating the plate-shaped part is formed on the outer surface of the spring fixing cylindrical body, and at a biasing time of biasing the erect system cylinder by using the double torsion spring, the end of the double torsion spring is pressed against a wall surface of the concave part.

7. The optical sighting device as claimed in claim 4, wherein the spring end fixing plate used for fixing the end of the double torsion spring and the spring end fixing plate used for fixing the other end of the double torsion spring are fixed at positions facing each other by sandwiching a center of a circle of a cross-section orthogonal to an axial direction of the spring fixing cylindrical body on the outer surface of the spring fixing cylindrical body.

8. The optical sighting device as claimed in claim 1, wherein the adjustment mechanism is a mechanism that performs adjustment to an impact position by tilting an axial direction of the erect system cylinder, and the adjustment mechanism further has:

an upper-lower adjustment operation part, receiving, from a user, an operation that performs adjustment to the impact position in an upper-lower direction; and a left-right adjustment operation part, receiving, from the user, an operation that performs adjustment to the impact position in a left-right direction, as the advancing-retracting member, an upper-lower advancing-retracting shaft, which is the advancing-retracting member that is shaft-like and advances and retracts in the upper-lower direction in accordance with the operation of the user with respect to the upper-lower adjustment operation part, and a left-right advancing-retracting shaft, which is the advancing-retracting member that is shaft-like and advances and retracts in the left-right direction in accordance with the operation of the user with respect to the left-right adjustment operation part are provided, and the double torsion spring biases the erect system cylinder with respect to both the upper-lower advancing-retracting shaft and the left-right advancing-retracting shaft.

* * * * *